United States Patent [19]

Bedics

[11] Patent Number: 5,273,258
[45] Date of Patent: Dec. 28, 1993

[54] CORNER/RETURN CONSTRUCTION FOR IMPACT-RESISTANT HANDRAILS

[75] Inventor: Michael A. Bedics, Poughquag, N.Y.

[73] Assignee: Pawling Corporation, Pawling, N.Y.

[21] Appl. No.: 840,337

[22] Filed: Feb. 24, 1992

[51] Int. Cl.[5] .......................................... E04H 17/00
[52] U.S. Cl. ......................................... 256/59; 256/65; 403/403; 52/287; 248/345.1
[58] Field of Search ................................. 256/59-60, 256/65-70; 248/345.1, 251; 52/254, 288, 287, 718.1; 403/403, 205, 382

[56] References Cited

U.S. PATENT DOCUMENTS

| | | | |
|---|---|---|---|
| 3,333,823 | 8/1967 | Genauer et al. | 256/65 |
| 3,491,984 | 1/1970 | Nyberg | 256/21 |
| 3,825,229 | 7/1974 | Bartlett et al. | 256/59 |
| 3,910,562 | 10/1975 | Helterbrand | 256/65 |
| 4,161,853 | 7/1979 | Weiss et al. | 52/254 X |
| 4,193,585 | 3/1980 | Eandi | 256/65 |
| 4,194,338 | 3/1980 | Trafton | 52/721 |
| 4,196,552 | 4/1980 | Bartlett | 248/345.1 X |
| 4,353,529 | 10/1982 | Brown | 256/59 |
| 4,637,589 | 1/1987 | Lin | 256/59 |
| 4,696,136 | 9/1987 | Grewe | 52/287 X |
| 4,714,367 | 12/1987 | Baus | 403/104 |
| 4,852,318 | 8/1989 | Anderson | 52/287 X |
| 5,026,588 | 6/1991 | Diekmann | 428/100 |
| 5,165,643 | 11/1992 | Shreiner | 256/59 X |

FOREIGN PATENT DOCUMENTS

| | | | |
|---|---|---|---|
| 2612543 | 9/1988 | France. | |
| 2-200954 | 8/1990 | Japan | 256/59 |
| 3-233066 | 10/1991 | Japan | 256/59 |

OTHER PUBLICATIONS

Selection Guide 1991, Pawling Pro Tek Impact Protection Systems p. 30.

*Primary Examiner*—Randolph A. Reese
*Assistant Examiner*—Harry C. Kim
*Attorney, Agent, or Firm*—Schweitzer Cornman & Gross

[57] ABSTRACT

A corner structure is provided for impact-resisting handrail installations. The design of the structure is such that the same principal components may be employed in constructing outside corners, inside corners and returns. The corner structure includes a molded tubular shell of arcuate configuration, for connection to each of two right angularly related straight handrail sections or from one handrail to an adjacent wall. An internal skeletal support member is mounted within the hollow tubular shell, by closure panels secured to and closing the opposite ends of the shell. The skeletal support member includes an arcuate central portion arranged in confronting and supporting relation to the outwardly facing wall of the shell. Connecting elements project outward through each of the closure panels for rigid connection to the adjacent straight handrail sections. By substitution of two different internal skeletal supports, the corner structure can be configured for inside and outside corners. The skeletal supports themselves are adapted to be inexpensively produced by extrusion processes. Substantial savings in manufacturing costs are realized.

16 Claims, 4 Drawing Sheets

CORNER/RETURN CONSTRUCTION FOR IMPACT-RESISTANT HANDRAILS

BACKGROUND AND SUMMARY OF INVENTION

Many institutional buildings, especially hospitals and the like, utilize impact-resistant handrail structures installed along the walls of corridors. Advantageous forms of such impact-resistant handrail structures employ internal skeletal supports, typically formed of aluminum extrusions, which are mounted to stand off slightly from the wall surface. The skeletal support is partially enclosed by a plastic shell, also of extruded construction, which extends over the top, bottom and front surfaces of the structure to present a smooth, continuous surface to the outside. The internal skeletal structure provides limited internal support for the shell, in some cases including internal resilient support elements, such that the shell is permitted to flex, if necessary, to absorb impact. Thus, when the handrail is impacted by wheeled devices commonly utilized in such structures (e.g. carts, hospital beds, movable apparatus of various kinds), the handrail structure can absorb substantial impact without being permanently damaged.

While the straight-run portions of such handrail structures can be constructed and assembled in a relatively straightforward manner, the corner areas and returns have presented more difficult problems. The corners typically are right angle sections, either external or internal, where two walls meet. The corner sections join two adjacent straight line sections of a continuous handrail structure. Likewise, where the handrail structure terminates, it is conventional to provide a return section, which is externally similar to a corner section, but functions to connect the terminal end of a handrail section to the flat face of the adjacent wall to provide a neat, clean end construction for the handrail.

While the design of effective impact-resistant straight line handrail sections has been well developed, imparting a desired degree of impact-resistance to the corner sections and returns, while still providing a construction that is visually consistent with the straight line sections has proven somewhat more difficult, especially without introducing considerable extra manufacturing expense.

In accordance with the present invention, a simple and inexpensive, yet highly effective impact-resistant corner construction is provided, which is easily adaptable to inside or outside corner installations, as well as for returns. The corner assembly, in both weight and appearance, is consistent with the remainder of the handrail structure and is easily installed therein.

Pursuant to the invention, a corner or return section comprises an arcuate tubular section of relatively thin walled plastic material which is externally consistent with the extruded linear shell utilized on the main section of the handrail. An impact-resisting skeletal support element is installed internally of the arcuate tubular section. The skeletal support member is of a lightweight construction, and provides support for either the external or the internal wall of the tubular section, depending on the orientation of the corner, that is, whether the inside or the outside wall of the arcuate tubular section is exposed to impact. The skeletal support member is mounted and retained in the tubular section by means of recessed end plates, which close off the opposite ends of the tubular section, while allowing tang-like extensions of the support member to project beyond each end of the corner section, for attachment to an adjacent, straight line section of the handrail structure.

To particular advantage, the internal skeletal support member for the corner section may be of extruded construction. However, instead of being an elongated linear extrusion aligned with the axis of the rail, as in the case of the straight line handrail sections, the extrusion axis of the corner skeletal section is at right angles to the axis of the handrail. Individual internal skeletal support elements are derived by cutting the extruded section into appropriate relatively short-length sections.

For a more complete understanding of the above and other features and advantages of the invention, reference should be made to the following detailed description of preferred embodiments of the invention, together with the accompanying drawing,

DESCRIPTION OF A PREFERRED EMBODIMENT

Figures 1, 7:
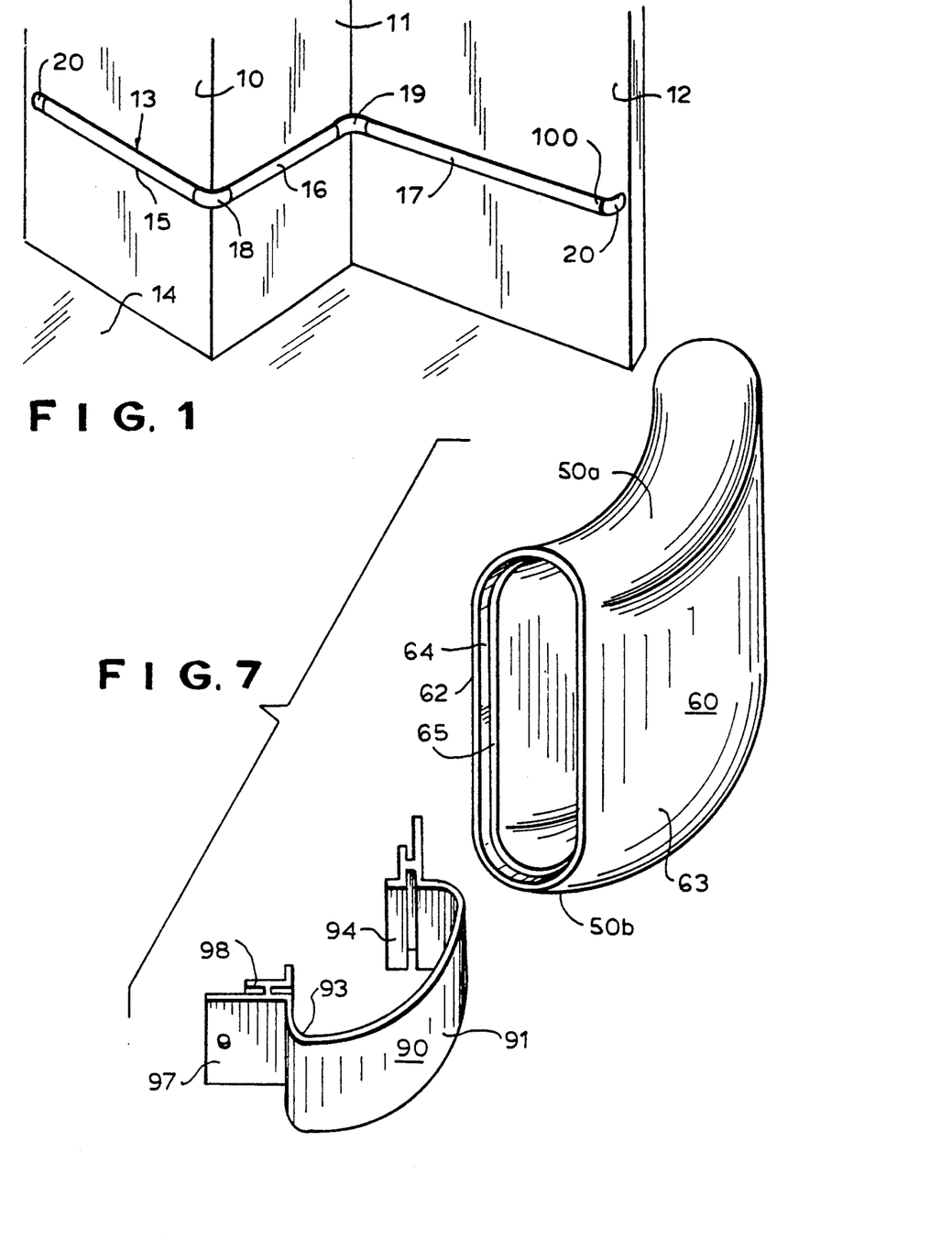
FIG. 1 is a simplified perspective view of a handrail installation incorporating features of the invention.
FIG. 7 is an exploded perspective view illustrating components selected constructing the external corner shown in FIGS. 5 and 6.

Referring now to the drawing, the illustration of FIG. 1 shows an architectural structure having a series of wall panels 10, 11, 12, forming one side of a short corridor section, with the intermediate wall panel 11 disposed at right angles to the panels 10, 12. This arrangement is of course purely for illustrative purposes, in order to provide a full understanding of the invention. An impact-resisting handrail assembly 13 extends along the series of wall panels 10–12, at a height above the floor 14 suitable to enable a person to grip the rail. Typically, the handrail structure is mounted to be spaced slightly from the surface of the wall panels, for example, about 1.5 inches, and is constructed to provide resistance to impact from wheeled vehicles, for example, which may be pushed along the corridor. In general, impact-resisting handrail structures of this type are well known and widely used. A particularly advantageous form of such handrail is made available commercially by Pawling Corporation, Pawling, N.Y., under its style designation BR-1100.

As shown in FIG. 1, the handrail structure 13 includes linear segments 15, 16, 17 which span the faces of the wall panels 10–12. At the juncture of the panels 10, 11, the handrail sections 15, 16 are joined by an external corner fitting 18. At the juncture of wall panels 11, 12, the handrail section 16, 17 are joined by an internal corner structure 19. Where a linear section of handrail, for example, the rail section 17, terminates without joining another linear section, a so-called return structure 20, similar to an external corner structure, is installed to merge the otherwise exposed end of the handrail structure to the face of the wall.

Figure 2:
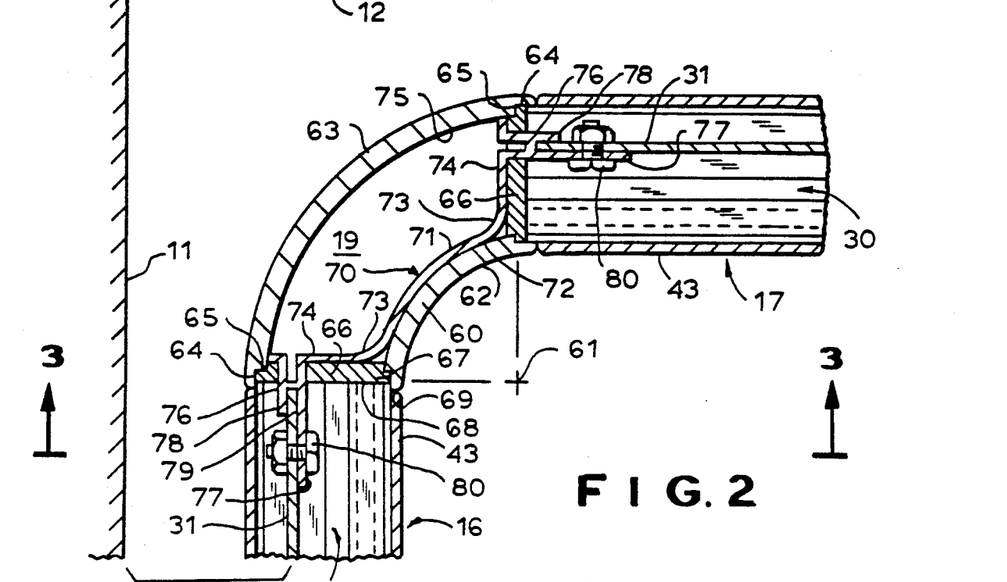
FIG. 2 is an enlarged horizontal cross sectional view of a handrail installation incorporating a corner construction according to the invention, particularly for an inside corner.
Figure 3:
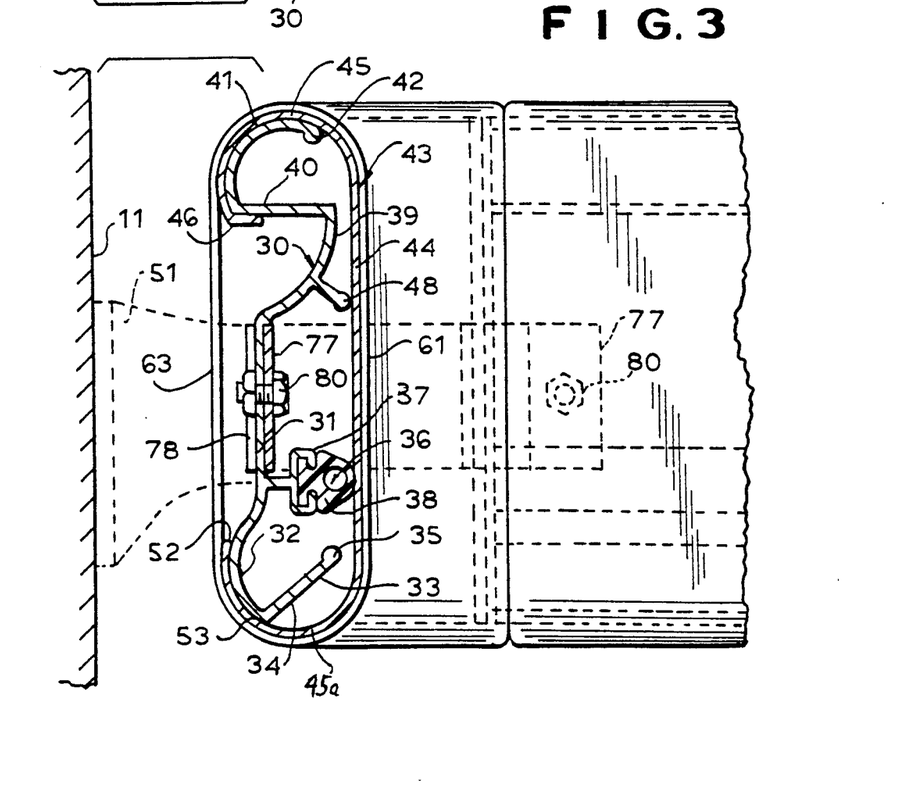
FIG. 3 is a cross sectional view as taken generally along line 3—3 of FIG. 2.

With reference to FIGS. 2 and 3, a typical and advantageous form of handrail structure (in itself not part of this invention) comprises an elongated internal support member 30, typically of extruded aluminum. In cross section, the support member includes a generally flat, vertically oriented central section 31. Integrally joined to the bottom of the central section is a convex arcuate lower back wall section 32 and an upwardly and outwardly extending section 33, providing a downwardly inclined guide surface 34. At the upper, outer extremity of the inclined support section 33 is an impact support 35.

Extending forwardly from the lower edge of the central portion 31 is a resilient impact support structure 36 comprised of an integral extruded metal channel section 37 which receives a continuous strip 38 of deflectable elastomeric material.

Extending upwardly and forwardly from the upper edge of the central section 31 is a rearwardly concave section 39 which joins at its upper end with a rearwardly extending portion 40. The portion 40 in turn integrally joins with an upwardly and forwardly extending convex upper support element 41. Desirably, the upper support element 41 extends in a smooth arc to a point at least slightly forward of its center of curvature and terminates in an enlarged edge rib 42. A cover shell 43, comprising an elongated, straight extruded section of structural plastic, typically polyvinyl chloride, is arranged to be received over the internal support 30, providing a flat smooth front surface 44, and smoothly rounded top and bottom surfaces 45, 45a. The arcuate top portion of the shell desirably conforms closely to the arcuate support element 41 and terminates in a short, forwardly directed flange 46, which underlies the rearwardly directed support element 40. The bottom arcuate portion 45a of the cover shell extends behind and desirably conforms to the lower arcuate section 32 of the support. To advantage, an impact support 48 extends downwardly and forwardly from the arcuate portion 39 of the support, arranged to bear on the internal surface of the cover shell 43 to assist in resisting impact forces applied to the front of the rail structure. The elastomeric strip 38 also is arranged to bear against a lower internal portion of the cover shell 43, also to provide impact resistance.

As is reflected in FIG. 3, for example, the handrail structure is mounted to a wall 11, by means of stand-off supports 51. These are secured to the wall at suitably spaced points and are fastened to the flat central portion 31 of the handrail internal structure 30. This arrangement enables a user to grip the upper portion of the rail, with the fingers passing around the top of the rail and being received in the rearwardly facing recess defined by the arcuate portion 39 and the rearwardly projecting portion 40.

In a typical installation, the internal support 30 is rigidly mounted to the adjacent wall panel by two or more of the stand-off supports 51. Thereafter, the cover shell 43 is applied over the support. This is conveniently accomplished by engaging the upper portion of the shell with the upper portion 41 of the support, with the lower portion of the cover shell initially remaining on the front side of the support. Thereafter, the bottom of the cover shell is pressed toward the wall with sufficient force to cause the lower edge extremity 52 of the shell to be forced downward by the inclined surface 33 of the support. Once the edge extremity 52 of the shell clears the lowermost extremity 53 of the internal support, the natural resilience of the shell causes it to snap into place, in the position shown in, for example, FIG. 3.

Figure 4:
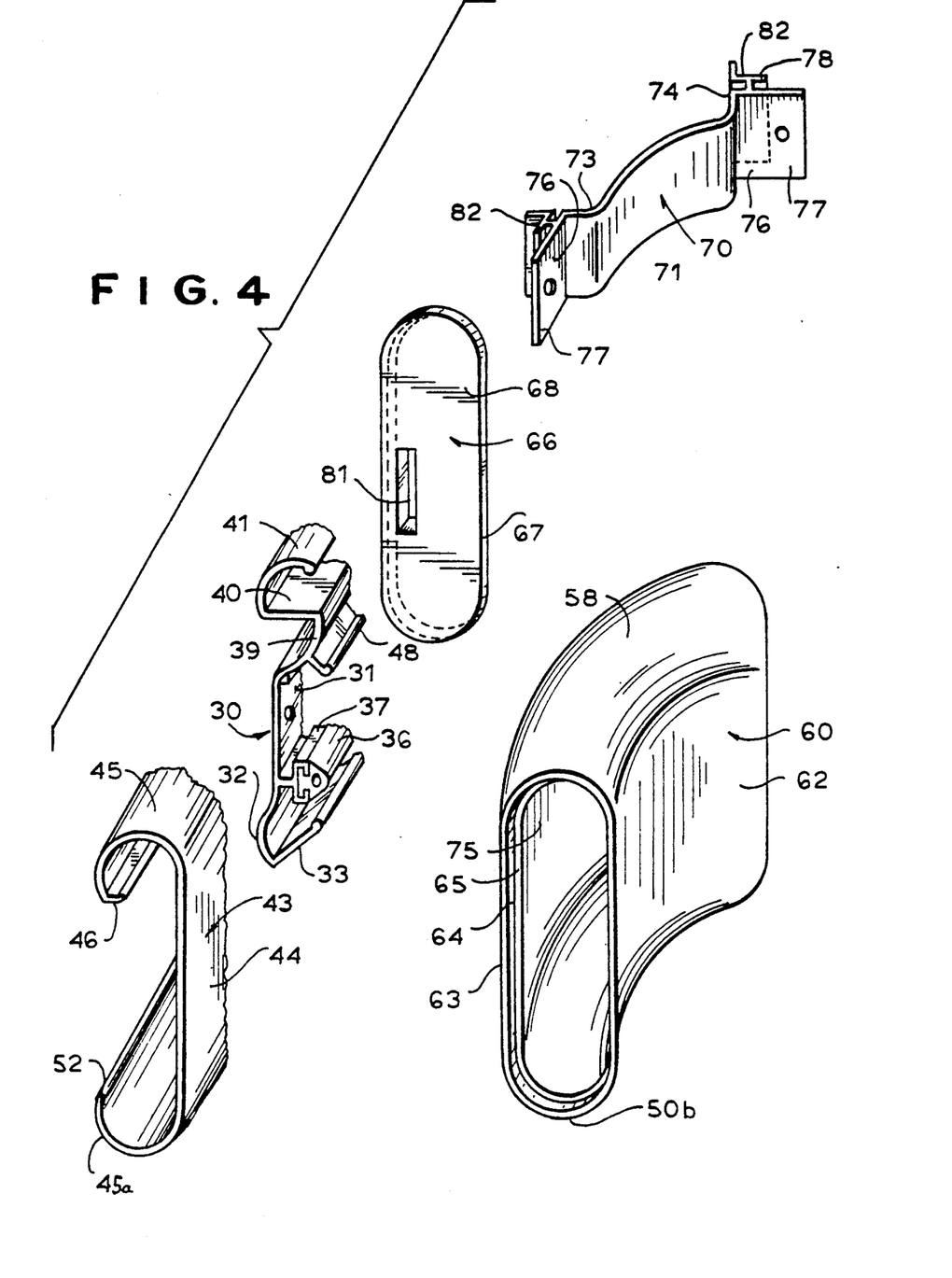
FIG. 4 is an exploded view illustrating the various component parts forming a corner assembly, such as illustrated at FIG. 2.
Figure 5:
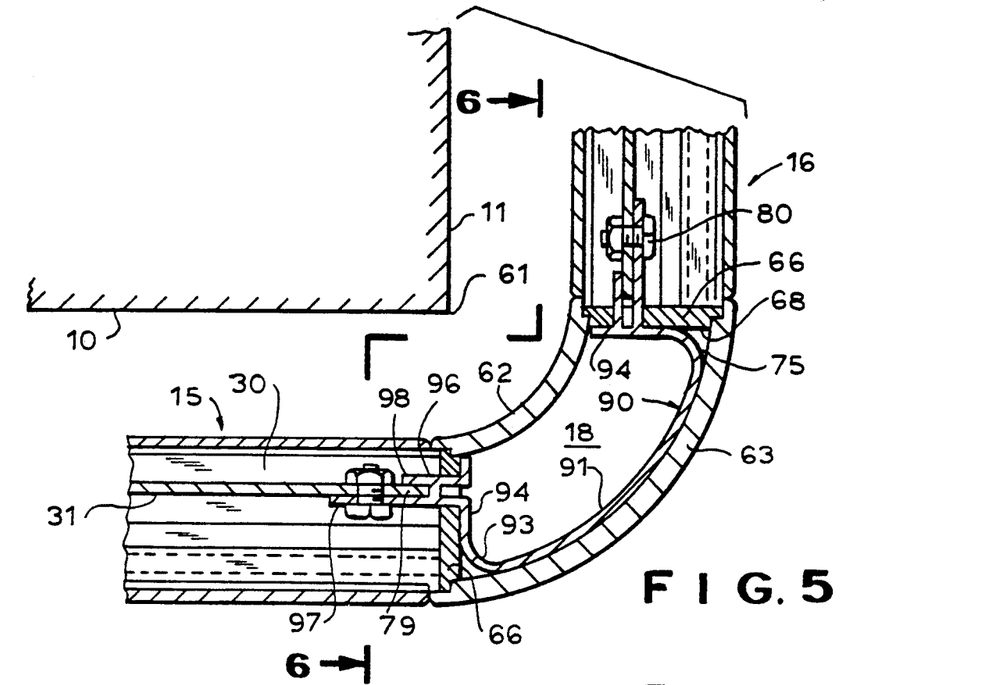
FIG. 5 is an enlarged cross sectional view, as taken on line 5—5 of FIG. 6, showing an external corner installation according to the invention.

FIGS. 2 and 5 illustrate the manner in which a pair of associated, right angularly related handrail sections are joined by inside and outside corner structures respectively. With reference initially to FIGS. 2–4, an inside corner structure includes an arcuate tubular corner shell 60, which may be formed of the same material as that used for the linear cover shell 43. However, the tubular corner shell 60 is of molded, rather than extruded construction. Pursuant to one aspect of the invention, the design of the tubular corner shell 60 is such that the same part may be employed in both the inside and outside corner structures, as well as for returns. This is advantageous in minimizing the investment in expensive molds for the part as well as in production inventory.

The corner shell 60 is of hollow tubular construction, desirably having generally vertical arcuate walls 62, 63 connected by top and bottom walls 50a, 50b of generally semi-circular cross section. Pursuant to known practice, the frontal cross sectional configuration of the corner shell 60 substantially corresponds to that of the handrail cover shell 43, so that the corner shell at least approximates a continuation of the shell 43.

In the illustrated corner structures, which are intended for right angle corners, the tubular corner shell 60 has a predetermined center of curvature 61 which may, by way of example, be approximately 1¼ inches from the wall 62 of smaller radius and approximately three inches from the wall 63 of maximum radius. In an advantageous embodiment, the corner shell 60 may have a relatively uniform wall thickness of about 0.2 inch.

As shown in FIG. 2, the corner shell 60 spans an arc of 90°, so that its opposite ends are aligned with the ends of respective linear handrail sections 16, 17. At each end, the tubular corner shell is formed with an internal recess 64 forming an outwardly facing recessed shoulder 65. The recesses 64 are arranged to tightly receive shouldered closure panels 66 which are shaped to correspond closely with the shape of the recessed open ends of the corner shell 60. The arrangement is such that the shouldered closure panels 66, when placed in the shouldered recesses 64, close the respective opposite ends of the tubular corner shell 60 and provide structural support for the tubular shell at its ends. The shouldered closure panels desirably are formed of a suitable plastic material similar to that used in the tubular corner shell 60 itself. The closure panels may be machined from flat stock, but are more advantageously molded.

As shown in FIG. 2, the depth of the shouldered recesses 65 in the tubular corner shell advantageously is somewhat greater than the thickness of the flanged outer portions 67 of the closure panels such that the exposed faces 68 of the closure panels are recessed slightly, for example (0.1 inch) with respect to the end extremities 69 of the tubular corner shell. With this arrangement, the main linear cover shell 43 of the straight line handrail portion advantageously is cut slightly shorter than the internal support, allowing a short stub section of the support 30 to extend into the end of the corner shell recess 64 to abut the exposed face 68 of the closure panel. This assists in the proper alignment of the corner shell 60 with the adjacent cover shell 43.

Pursuant to the invention, an advantageous arrangement is provided for internally supporting the corner shell 60 against impact forces applied to the exposed surface thereof. Thus, in the arrangement of FIG. 2, showing an inside corner structure, the outwardly facing wall 62 may be subject to impact, while the inwardly facing wall 63 is of course facing away from any source of impact forces. To support the outwardly facing wall 62, an internal skeletal support element 70 is provided, which comprises an arcuate support section 71, arranged in closely confronting relation with the internal surface 72 of the exposed wall 62 of the corner shell 60. The support section 71 conforms to the contours of the internal surface 72 to a point close to the ends thereof, where it is connected by arcuate transition sections 73 with generally flat end sections 74. The end sections 74 are arranged in confronting relation to the inside surfaces of the closure panels 66, and desirably extend across the full internal width of the corner cover shell 60, substantially to the opposite inside surface 75 thereof.

At each end, the internal skeletal support element 70 is provided with an integral, outwardly projecting connecting element 76, each comprising a first, relatively elongated connecting panel 77 and a parallel spaced-apart, shorter connecting panel 78. The spacing between the respective connecting panels 77, 78 is such as to closely receive the end portion 79 of the vertical central section 31 of the adjacent handrail support 30. Each of the respective connecting panels 77, and the associated support sections 31 is provided with an opening to receive a nut and bolt assembly 80, or other fastening device.

As is evident in FIGS. 2 and 4, the internal skeletal support 70 has a uniform cross section throughout its height, when viewed in the section of FIG. 2. Accordingly, the skeletal support 70 may advantageously be produced by extrusion along the axis of its uniform cross section. Elongated lengths of such section, may then be cut to predetermined, relatively narrow strips, as reflected in FIG. 4, for example. In a typical and advantageous handrail installation, where the overall height of the rail may be 5½ to 6 inches, it may be adequate to provide an internal skeletal support having a vertical height of, for example, 1.5 inches.

Desirably, the respective end closure panels 66 are formed with openings 81 (see FIG. 4) of a size and shape to closely receive the base portions 82 of the connecting elements 76.

In the initial assembly of a corner structure, an internal skeletal support 70 is inserted into an open corner shell 60 (FIGS. 2, 4). Closure panels 66 are then applied over the projecting connectors 76 and inserted into the shouldered recesses 64. As will be appreciated, a relatively close fitting relationship between the projecting portions 76 of the skeletal support 70 and the openings 81 in the respective closure panels will serve to accurately position the skeletal support 70 within the interior of the corner cover shell 60, with the arcuate support section 71 in a desired supporting and confronting relation to the exposed wall 62 of the cover. To advantage, the closure panels 66 are permanently secured in the shouldered recesses 64, by means of suitable adhesive means.

A corner structure 19 is installed after mounting of the internal supports 30 of the respective handrail sections 16, 17 (FIG. 2), but before installation of the cover shells 43 thereon. The corner assembly is rigidly fixed to the respective internal supports by means of the bolts 80. After the corner structure has been rigidly connected to each of the adjacent handrail sections 16, 17, and similar connections have been made at the opposite ends of these rails, the cover shells 43 thereof may be installed over the linear supports 30.

Figure 6:
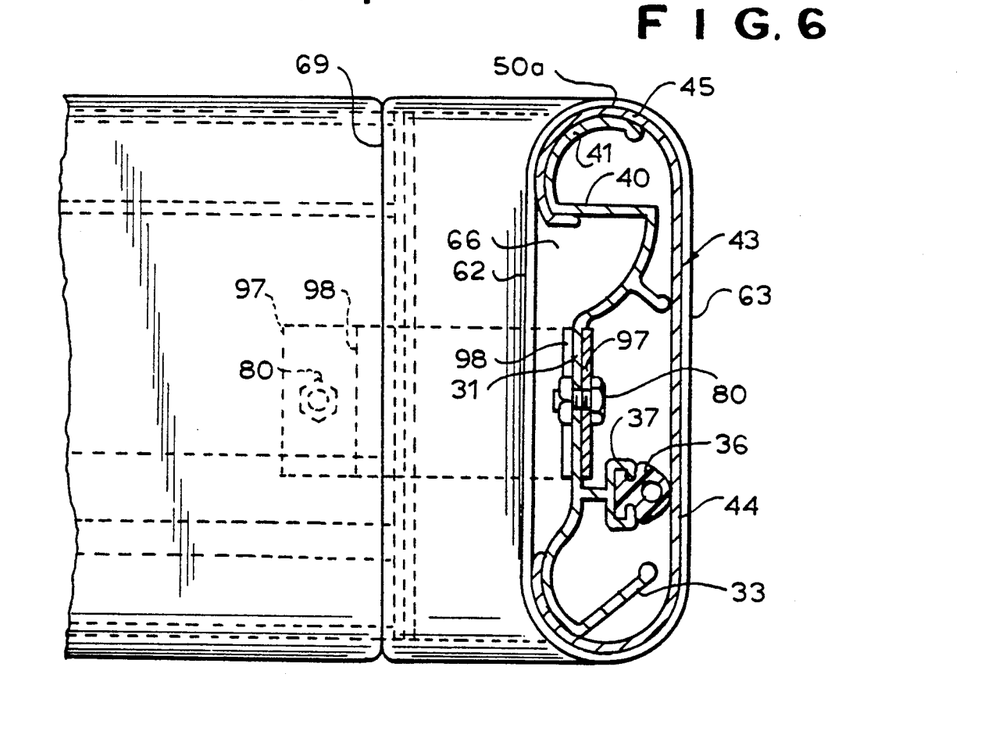
FIG. 6 is a cross sectional view as taken generally on line 6—6 of FIG. 5.

With reference to FIGS. 5-7, there is shown a corner structure designed to join two linear handrail sections 15, 16 at an external corner. In these figures, common reference numerals may be employed to designate parts described with reference to FIGS. 2-4. In this respect, the construction and installation of the linear handrail portions 15, 16 is exactly as previously described and will not be repeated.

Pursuant to one aspect of the invention, the external corner structure 18 utilizes a tubular corner shell 60 identical to that used for the inside corner 19. The orientation of the tubular shell is, however, reversed, so that the center of curvature 61 is located approximately at the intersection of the respective wall panels 10, 11.

An internal skeletal support 90 is provided for the corner shell 60. The support 90 is similar to the support 70 of the previously described embodiment, except that the support 90 includes a central arcuate support section 91 arranged in confronting relation to the internal surface 75 of the outwardly facing wall 63 of the tubular corner shell. The internal skeletal support 90 includes arcuate corner portions 93 merging into generally flat end sections 94 at each end arranged in confronting relation to the inside surfaces of the respective end closure panels 66. As will be understood, the end closure panels 66 used for the external corner structure may be identical to those used for the internal corner structure. In the illustrated arrangement, the opening 81, provided in each of the closure panels 66 is offset to one side of the vertical center line thereof. In each case, the closure panels are installed so that the openings 81 are offset toward the wall.

As shown in FIGS. 5 and 7, the internal skeletal support 90 is provided with outwardly projecting connecting portions 96, which extend through and are received closely within the closure panel openings 81 such that the skeletal support 90 is firmly supported in the corner structure by confinement of the connecting portions 96 in conjunction with the confronting relationship of the support portion 91 and the end sections 94.

The respective connecting elements 96 each include spaced parallel connecting panels 97, 98 arranged to be received over and to confine the end extremity 79 of the web section 31. Bolts 80 are other suitable means are utilized to secure the connecting elements 96 to the vertical central web section 31 of the handrail supports 30 at each end of the corner structure. As in the case of the internal corner, the external corner structure is installed on and tightly secured to each of two right angularly related handrail sections 15, 16 after the handrail supports 30 have been mounted on the respective walls 10, 11, but before the outer cover shells 43 are applied.

As shown at 20 in FIG. 1, a handrail installation frequently terminates with a return 20. The return is substantially in the form of an external corner, which is connected at one end to the handrail, as at 100 in FIG. 1 and extends over the adjacent wall 12. The return 20 may be, but frequently is not connected to the wall, being more customarily supported in cantilever relation from the end of the handrail.

Pursuant to the invention, the return 20 can be constructed utilizing the same tubular corner shell 60 employed for the internal and external corners. In addition, an internal skeletal support 90, as used in the external corner structure, may be employed in the return. Where it is used for the return, however, the connecting element 96 at the wall end of the return is substantially removed, preferably leaving only a short stub section to project into the panel opening 81 to secure the skeletal support 90 properly in position at the end of the return structure. If desired, the end of the tubular corner shell 60 adjacent the wall may be trimmed slightly for a more precise fit against the wall.

The corner/return structure of the invention is particularly advantageous because of its simplicity and versatility. The same tubular corner shell 60 and closure panels 66 may be employed for both inside and outside corners, as well as for the return. This minimizes mold expense for these items, and also greatly reduces inventory requirements. This translates directly into lowering the cost of manufacture.

The only distinctive part employed in the various configurations of the invention is the internal skeletal support 70/90. These components are, in accordance with the invention, designed to be produced by linear extrusion and simply severed to length at production time. This also contributes to the efficiencies and economies of manufacture.

It should be understood, of course, that the specific form of the invention herein illustrated and described is intended to be representative only, as certain changes may be made therein without departing from the clear teachings of the disclosure. Accordingly, reference should be made to the following appended claims in determining the full scope of the invention.

I claim:

1. A handrail corner structure for joinder with a linear handrail assembly, wherein the handrail assembly comprises an elongated linear internal support member of generally uniform cross section mounted on an architectural structure and an elongate, open-sided external cover shell constructed for snap-on application over said internal support member, said corner structure comprising
   (a) a tubular corner shell formed with first and second ends and a generally arcuate configuration for alignment with and connection at one end to an end of a handrail assembly,
   (b) said corner shell having radially inside and outside arcuate walls and top and bottom walls connecting said arcuate walls to form a hollow tubular cross sectional configuration,
   (c) said corner shell having one arcuate wall thereof facing outwardly with respect to the architectural structure,
   (d) an internal skeletal support for said corner shell,
   (e) said internal skeletal support comprising a first portion of arcuate contour arranged in confronting and supporting relation to said outwardly facing wall to support said wall against impact deflection toward said architectural structure,
   (f) said internal skeletal support having end flanges located adjacent the respective ends of said corner shell and extending from said outwardly facing arcuate wall toward the other arcuate wall,
   (g) said internal skeletal support having at least one connecting portion joined with one of said end flanges and projecting beyond the adjacent end of said corner shell,
   (h) said connecting portion having a portion aligned in overlapping relation with an end portion of said elongated linear internal support member and being tightly secured thereto.

2. A handrail corner structure according to claim 1, further characterized by
   (a) the linear internal support member of said handrail assembly having a cross sectional configuration including upper and lower support portions, for engaging upper and lower portions of said external cover shell, and a medial portion extending between said upper and lower support portions,
   (b) said corner shell being provided at its ends with an internal recess adapted to receive and be partially supported by an end portion of said linear internal support member.

3. A handrail corner structure according to claim 2, further characterized by
   (a) the external cover shell of said handrail assembly being of slightly shorter length than said linear internal support member to accommodate the partial reception of said internal support member into said internal recess.

4. A handrail corner structure according to claim 1, further characterized by
   (a) said internal skeletal support being of extruded construction, having a generally uniform horizontal cross section throughout its length and a generally uniform vertical dimension from end to end.

5. A handrail corner structure according to claim 1, further characterized by
   (a) the outwardly facing wall of said corner shell comprising its radially outside arcuate wall, and
   (b) the first portion of said internal skeletal support being arranged in contacting relation to said radially outside arcuate wall.

6. A handrail corner structure according to claim 1, further characterized by
   (a) the outwardly facing wall of said corner shell comprising its radially inside arcuate wall, and
   (b) the first portion of said internal skeletal support being arranged in contacting relation to said radially inside arcuate wall.

7. A handrail corner structure according to claim 1, further characterized by
   (a) the projecting connecting portion of said internal skeletal support comprising spaced apart front and back panel-like elements arranged in straddling relation to the end portion of said elongated linear internal support member.

8. A handrail corner structure according to claim 1, further characterized by
   (a) said corner shell having at each end thereof an internal peripheral recess of size and shape to receive and be supported by the end portion of said linear internal support member,
   (b) a closure panel received in each said peripheral recess and substantially closing the ends of said corner shell,
   (c) at least one of said closure panels having an opening therein closely receiving the projecting connecting portion of said internal skeletal support.

9. A handrail corner structure according to claim 8, further characterized by (a) said internal peripheral recess and said closure panel being so configured that, when said closure panel is installed in said recess, said closure panel is spaced inward from the adjacent end of said shell to provide a shallow recess for the reception of the end portion of said elongated linear internal support member.

10. A corner structure for joining to a horizontally disposed linear handrail section, which comprises
(a) a hollow tubular corner shell formed with first and second ends and a generally arcuate configuration,
(b) said corner shell having radially inside and radially outside arcuate walls and top and bottom walls connecting said arcuate walls to form an arcuate tube open at each of said ends,
(c) an internal skeletal support for said corner shell received within the hollow tubular corner shell,
(d) said internal skeletal support comprising a first portion of arcuate contour arranged in confronting and supporting relation to a selected one of said arcuate walls to support said selected walls against impact deflection toward the interior of said shell,
(e) said internal skeletal support having end flange portions located adjacent the respective ends of said corner shell and extending generally transversely from said selected one of said arcuate walls toward the other of said arcuate wall,
(f) said internal skeletal support having at least one connecting portion joined with one of said end flange portions and projecting out of said corner shell at one end for attachment to said linear handrail section at one end thereof.

11. A corner structure according to claim 10, further characterized by
(a) closure covers secured at each end of said corner shell and substantially enclosing the hollow interior thereof,
(b) the respective end portions of said internal skeletal support begin arranged in confronting and supporting relation to said closure covers at each end of said corner shell.

12. A corner structure according to claim 10, further characterized by
(a) said corner shell being arcuate in a horizontal plane,
(b) said arcuate walls being of uniform cross section over a portion of their height, and
(c) said internal skeletal support being a short section of a metal extrusion having a uniform cross section along a vertical axis and having a vertical dimension substantially less than the height of said corner shell.

13. A corner structure according to claim 12, further characterized by
(a) the projecting portion of said internal skeletal support comprising first and second paced-apart connecting elements forming a recess between them for the reception of an end portion of said handrail section.

14. A corner structure for a handrail system, which comprises
(a) a tubular corner shell formed with first and second ends and a generally arcuate configuration,
(b) said corner shell having radially inside and outside arcuate walls and top and bottom wall connecting said arcuate walls to form a hollow tubular cross sectional configuration,
(c) an internal skeletal support for said corner shell,
(d) said internal skeletal support comprising a first portion of arcuate contour arranged in confronting and supporting relation to a selected one of said arcuate walls to support said selected wall against impact deflection toward the interior of said shell,
(e) said internal skeletal support having end portions located adjacent the respective ends of said corner shell and extending from said selected one of said arcuate walls toward the other arcuate wall,
(f) said internal skeletal support having at least one connecting portion joined with one of said end portions and projecting beyond the adjacent end of said corner shell for attachment to an external support,
(g) closure panels secured at each end of said corner shell and substantially enclosing the hollow interior thereof,
(h) the respective end portions of said internal skeletal support being arranged in confronting and supporting relation to said closure panels at each end of said corner shell,
(i) said corner shell having an internal peripheral recess at each end for receiving a closure panel, and
(j) said recesses being of such depth relative to the thickness of said closure panels that said covers are recessed with respect to the ends of said corner shell.

15. A corner structure for a handrail system, which comprises
(a) a tubular corner shell formed with first and second ends and a generally arcuate configuration,
(b) said corner shell having radially inside and outside arcuate walls and top and bottom wall connecting said arcuate walls to form a hollow tubular cross sectional configuration,
(c) an internal skeletal support for said corner shell,
(d) said internal skeletal support comparing a first portion of arcuate contour arranged in confronting and supporting relation to a selected one of said arcuate walls to support said selected wall against impact deflection toward the interior of said shell,
(e) said internal skeletal support having end portions located adjacent the respective ends of said corner shell and extending from said selected one of said arcuate walls toward the other arcuate wall,
(f) said internal skeletal support having at least one connecting portion joined with one of said end portions and projecting beyond the adjacent end of said corner shell for attachment to an external support,
(g) closure panels secured at each end of said corner shell and substantially enclosing the hollow interior thereof,
(h) the respective end portions of said internal skeletal support being arranged in confronting and supporting relation to said closure panels at each end of said corner shell,
(i) said internal skeletal support having a connecting portion at least one end, and
(j) the closure panel at said one end having an opening therein closely receiving and confining said connecting portion and from which said connecting portion extends.

16. A corner structure for a handrail system, which comprises
(a) a tubular corner shell formed with first and second ends and a generally arcuate configuration, (b) said corner shell having radially inside and outside arcuate walls and top and bottom wall connecting said arcuate walls to form a hollow tubular cross sectional configuration,
(c) an internal skeletal support for said corner shell,
(d) said internal skeletal support comprising a first portion of arcuate contour arranged in confronting and supporting relation to a selected one of said arcuate walls to support said selected wall against impact deflection toward the interior of said shell,
(e) said internal skeletal support having end portions located adjacent the respective ends of said corner shell and extending from said selected one of said arcuate walls toward the other arcuate wall,
(f) said internal skeletal support having at least one connecting portion joined with one of said end portions and projecting beyond the adjacent end of said corner shell for attachment to an external support,
(g) closure panels secured at each end of said corner shell and substantially enclosing the hollow interior thereof,
(h) the respective end portions of said internal skeletal support being arranged in confronting and supporting relation to said closure panels at each end of said corner shell,
(i) said internal skeletal support having connecting portions at each end,
(j) the closure panels each having an opening therein closely receiving and laterally confining said connecting portions and from which said connecting portions extend, and
(k) said closure panels providing lateral support for resisting impact forces applied to the arcuately contoured portion of said internal skeletal support.

* * * * *